(12) United States Patent
Kraus et al.

(10) Patent No.: US 11,959,644 B2
(45) Date of Patent: Apr. 16, 2024

(54) VALIDATION OF ADDITION OF CLEANING CHEMISTRY TO SELF-CLEANING OVEN

(71) Applicant: Ecolab USA Inc., Saint Paul, MN (US)

(72) Inventors: Paul R. Kraus, Apple Valley, MN (US); Frank Anthony Bocci, Greensboro, NC (US); Joseph C. Plante, Summerfield, NC (US); Devon Beau Hammel, Edina, MN (US)

(73) Assignee: Ecolab USA Inc., Saint Paul, MN (US)

( * ) Notice: Subject to any disclaimer, the term of this patent is extended or adjusted under 35 U.S.C. 154(b) by 832 days.

(21) Appl. No.: 17/028,499

(22) Filed: Sep. 22, 2020

(65) Prior Publication Data

US 2021/0095860 A1    Apr. 1, 2021

Related U.S. Application Data

(60) Provisional application No. 62/906,997, filed on Sep. 27, 2019.

(51) Int. Cl.
*F24C 14/00* (2006.01)
*G05B 19/401* (2006.01)

(52) U.S. Cl.
CPC .......... *F24C 14/005* (2013.01); *G05B 19/401* (2013.01); *G05B 2219/2643* (2013.01)

(58) Field of Classification Search
CPC .... G05B 2219/2643; G05B 2219/2613; G05B 19/048; F24C 14/005; F24C 14/00; A21B 3/006

See application file for complete search history.

(56) References Cited

U.S. PATENT DOCUMENTS

| 5,286,943 A | 2/1994 | Has |
|---|---|---|
| 7,924,424 B2 | 4/2011 | Erickson et al. |

(Continued)

FOREIGN PATENT DOCUMENTS

| DE | 10128024 B4 | 7/2006 |
|---|---|---|
| DE | 102008025294 A1 | 12/2009 |

(Continued)

OTHER PUBLICATIONS

International Patent Application No. PCT/US2020/051995, International Search Report and Written Opinion dated Dec. 7, 2020, 17 pages.

*Primary Examiner* — Ko-Wei Lin
(74) *Attorney, Agent, or Firm* — Fredrikson & Bryon, P.A.

(57) ABSTRACT

A system for controlling the initiation of a cleaning process for an interior of an appliance may include a detection sensor and a processor in communication with the detection sensor. The detection sensor may be configured to generate detection sensor data based on a sensed condition in a field of detection of the detection sensor which may comprise one or more pre-determined locations. The processor may control the initiation of an appliance cleaning process. The appliance cleaning process may comprise receiving detection sensor data representative of a first time and a second time, generating an initial condition based on the received detection sensor data representative of the first time, and generating a new condition based on the received detection sensor data representative of the second time. The processor may be additionally configured to compare the initial condition and the new condition and determine if cleaning product is present.

22 Claims, 3 Drawing Sheets

(56) References Cited

U.S. PATENT DOCUMENTS

| | | | |
|---|---|---|---|
| 8,004,683 | B2 | 8/2011 | Tokhtuev et al. |
| 8,193,470 | B1 | 6/2012 | Harlamert et al. |
| 8,375,848 | B2 | 2/2013 | Valentine et al. |
| 8,734,877 | B2 | 5/2014 | Homme et al. |
| 9,144,992 | B2 | 9/2015 | Yamakawa |
| 9,599,347 | B2 | 3/2017 | Furlanetto et al. |
| 9,664,564 | B2 | 5/2017 | Yoshida |
| 10,060,632 | B2 | 8/2018 | Lim et al. |
| 2005/0265423 | A1 | 12/2005 | Mahowald et al. |
| 2013/0146094 | A1 | 6/2013 | Riefenstein et al. |
| 2014/0299159 | A1 | 10/2014 | Helm |
| 2015/0302569 | A1 | 10/2015 | Armstrong et al. |
| 2018/0340693 | A1* | 11/2018 | Bauer .................... F24C 7/085 |
| 2021/0247074 | A1* | 8/2021 | Sinur ................. F24C 15/2021 |

FOREIGN PATENT DOCUMENTS

| | | |
|---|---|---|
| DE | 102010040690 A1 | 3/2012 |
| DE | 102015103671 A1 | 9/2016 |
| DE | 102015107597 A1 | 11/2016 |
| DE | 102017113371 A1 | 12/2018 |
| DE | 102017113372 A1 | 12/2018 |
| EP | 528250 B1 | 2/1995 |
| EP | 1669678 B1 | 10/2008 |
| EP | 2287813 B1 | 10/2014 |
| WO | 2016016351 A1 | 2/2016 |
| WO | 2017182214 A1 | 10/2017 |

\* cited by examiner

VALIDATION OF ADDITION OF CLEANING CHEMISTRY TO SELF-CLEANING OVEN

RELATED MATTERS

This application claims the benefit of U.S. Provisional Patent Application No. 62/906,997, filed Sep. 27, 2019, the entire contents of which are incorporated herein by reference.

TECHNICAL FIELD

This disclosure generally relates to automated cleaning devices, systems, and methods. More specifically, this disclosure relates to systems and methods for initiating a cleaning process for an interior of an appliance.

BACKGROUND

Poor maintenance for ovens, such as rotisserie ovens, can lead to the buildup of congealed fat or grease throughout the interior of the oven. Excessive buildup of such particles may result in unevenly cooked food or unwanted particles blowing throughout the interior of the oven and settling on the food.

Routinely cleaning the ovens can help negate or even eliminate such problems. Persistent and consistent cleaning can help ensure the longevity of the oven. Unfortunately, most cleaning operations can be fairly inconsistent, such as different amounts of cleaning product used and cleaning products being placed in different locations. Inconsistent cleaning operations can lead to the oven being improperly cleaned.

SUMMARY

In general, various embodiments relating to systems and methods for controlling the initiation of a cleaning process for an interior of an appliance are disclosed herein. Such embodiments can be used in an exemplary application to facilitate a thorough cleaning and/or sanitization of an appliance, for instance, the interior of an oven.

One embodiment includes a system for controlling the initiation of a cleaning process for an interior of an appliance. In this embodiment, the system includes a detection sensor and a processor. The detection sensor is configured to generate detection sensor data based on a sensed condition in a field of detection (FOD) of the detection sensor. The FOD of the detection sensor may comprise one or more pre-determined locations in the interior of the appliance and each pre-determined location can also be intended for the receipt of a cleaning product to be used during the cleaning process. The processor can be operatively coupled to the detection sensor and configured to control the initiation of an appliance cleaning process. The initiation of the appliance cleaning process may comprise receiving detection sensor data representative of a first time; generating an initial condition based on the received detection sensor data representative of the first time; receiving detection sensor data representative of a second time; generating a new condition based on the received detection sensor data representative of the second time; comparing the initial condition and the new condition; and determining if cleaning product is present at one or more of the one or more pre-determined locations at the second time. In some instances, the first time may be a time when no cleaning product is present at the one or more pre-determined conditions and the second time may be a time different than the first time.

In further embodiments, the detection sensor may be placed underneath the appliance. In some instances, at least one of the one or more predetermined locations may comprise a window (e.g. sapphire window). In some embodiments, the detection sensor may be at least one of a reflective sensor, a mass sensor, and a two prong detection mechanism.

Another embodiment may include a method for controlling the initiation of a cleaning process for an interior of an appliance. The method may comprise receiving sensor data from a detection sensor representative of a first time. The first time may be a time when no cleaning product is present within a (FOD) of a detection sensor. The FOD of the detection sensor may comprise one or more pre-determined locations in the interior of the appliance and each pre-determined location may be intended for the receipt of the cleaning produce used during the cleaning process. The method may further comprise generating an initial condition based on the received detection sensor data representative of the first time. Additionally, the method may comprise receiving sensor data from the detection sensor representative of a second time, different than the first time, as well as generating a new condition based on the received detection sensor data representative of the second time. The method may then additionally include determining if cleaning product is present at the one or more pre-determined locations at the second time based on the comparison of the initial condition and the new condition.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives. For simplicity, embodiments of the invention are described with respect to a self-cleaning oven system. Other uses of the present invention have been contemplated, such as in various other appliances (e.g. laundry applications, dishwashing applications, commercial cleaning operations, food preparation, healthcare applications, vehicle care applications, and others known in the art may implement self-cleaning systems similar to the embodiments describing self-cleaning ovens).

Figure 1:
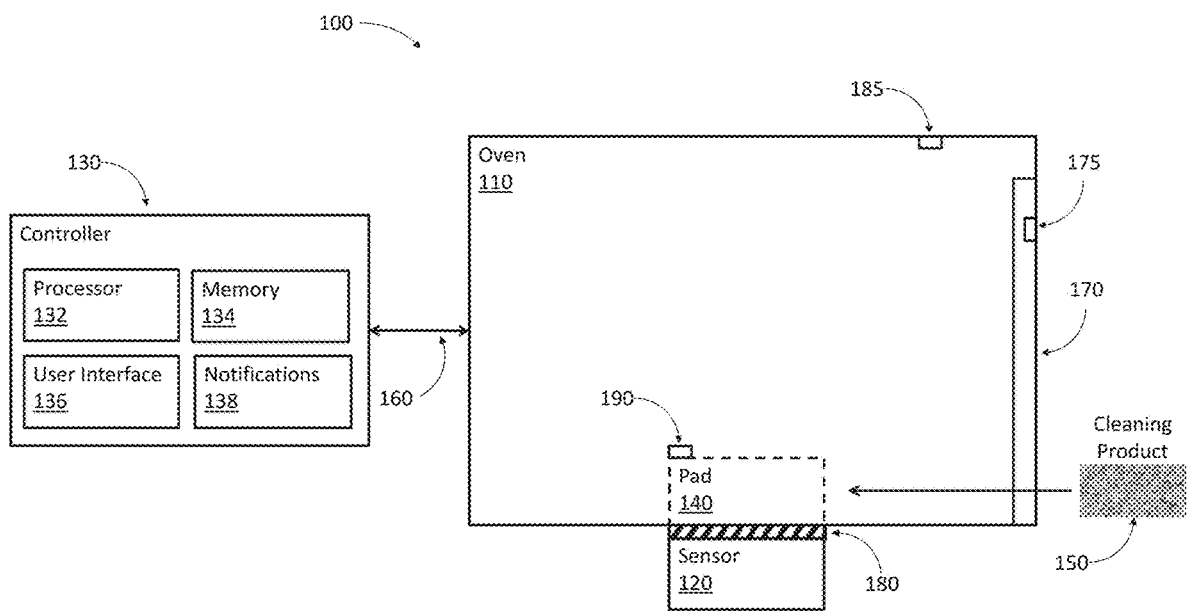
FIG. 1 is a diagram illustrating an example of a self-cleaning oven utilizing a sensor that detects the presence and/or absence of cleaning product in the oven.

FIG. 1 is a diagram illustrating an example self-cleaning oven system 100. Self-cleaning oven system 100 includes an oven 110, detection sensor 120, and controller 130. Oven 110 may comprise a door 170 for inserting a cleaning product 150 and a pad 140 as a designated location for cleaning product 150. Oven 110 may additionally include auxiliary sensors, such as a proximity sensor 175 and an ambient temperature sensor 185. The detection sensor 120 may be configured to detect the addition of cleaning product 150 into oven 110, preferably located on pad 140. Cleaning product 150 may be of a plurality of cleaning products such as block, powder, or liquid cleaning products used to clean ovens.

Controller 130 can include a processor 132, a memory 134, a user interface 136, and notifications 138. Controller 130 communicates with oven 110 via connection 160. Connection 160 may include, for example, a standard I2C connection, a 4-20 mA signal, a LoRa gateway, or a wireless connection such as via a Bluetooth connection. However, any appropriate connection/communication channel known in the art may be used. In some embodiments, detection sensor 120 is directly connected to controller 130; however other embodiments may include a controller or transmitter on oven 110 to communicate with control 130. In embodiments wherein oven 110 comprises auxiliary sensors, such as an ambient temperature sensor 185, and a proximity sensor 175, the auxiliary sensors may communicate directly with controller 130 or may transmit the data indirectly, such as through a controller or transmitter located on oven 110.

Memory 134 may store software for running system controller 130 and also can store data that is generated or used by processor 132. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before the self-cleaning oven system is used for another application. Processor 132 can be configured to run software stored in memory 134 to manage the operation of the self-cleaning oven system 100. Processor 132 may also be implemented as a System on Chip that integrates some or all components of a computer or other electronic system into a single chip. Subsequently, the processor 132 (processing circuitry) may send any processed data to a display, such as user interface 136 or other output/control devices. User interface 136 may be as simple as a few user actuatable buttons or may include a display, a keyboard or keypad, a mouse or other appropriate mechanisms for communicating with a user. Even though processor 132, memory 134, and user interface 136 are represented as singular blocks in the single controller 130, in some embodiments there may be multiple processors, memories, and user interfaces as well as multiple controllers for the self-cleaning oven system 100.

Notifications 138 may comprise a visual notification, an audible indication, or the like. For example, notifications 138 may be an ongoing notification, such as a light on controller 130 or oven 110, or an ongoing notification such as having a notification being displayed on a display. Additionally or alternatively, notifications 138 may comprise an instantaneous notification, such as controller 130 or oven 110 producing a tone, having components vibrate, or the like.

Pad 140 may be an end use location of the cleaning product or may be some other intermediate location. In some embodiments, the cleaning product(s) may be placed on one or more pads 140 that are designated locations to fully clean the oven during the cleaning cycle. Additionally or alternatively, one or more locations necessary to fully clean an oven may be difficult or dangerous to reach. For such embodiments, pad 140 may be an intermediate location, such that after the detection of a cleaning product on pad 140, the cleaning product is transferred to a second location. Cleaning product 150 may also be placed on pad 140 through the use of a chute or tube. In some embodiments, a detection mechanism (e.g. two prong detection mechanism 190) may be used to determine if cleaning product 150 is present on pad 140. In such embodiments, when both prongs of detection mechanism 190 come in contact with cleaning product 150, an electrical circuit between the two prongs is completed. The completion of the electrical circuit between the two prongs of detection mechanism 190 may be used to indicate that cleaning product 150 is present.

The placement of cleaning chemistry 150 may be done using any method known in the art. Example placement methods may include the use of a dispenser mechanism or placement by a user. For simplicity and not by limitation, the placement method will be referred to herein as placement by a user. For example, when self-cleaning oven system 100 is used in a rotisserie oven application, the cleaning product(s) 150 may be placed on a pad 140 located near the liquid intake for cleaning, such as at the back of the oven. In such an example, cleaning product(s) 150 may include tablets, blocks, or powder composed of cleaning agents, such as Ecolab Oven Cleaning Tablets; Retail CIP Oven Cleaner, or other products known in the art.

Pad 140 may be at a known location within the interior of the oven such as a location on the floor of oven 110. Preferably, Pad 140 will be within the field of detection (FOD) of detection sensor 120. The FOD of detection sensor 120 is the portion of a scene that the sensor can detect. Essentially, the FOD is a rectangle or circle extending out from the center of the sensor. For some sensors, the FOD will additionally depend on the distance from the sensor. A sensor's FOD can be compared to an optical sensor's field of view (FOV), however it is still understood that detection sensor 120 may comprise an optical sensor. In some embodiments, pad 140 may be the entirety of detection sensor 120's FOD. Alternatively, pad 140 may be partially located within the FOD of detection sensor 120.

Detection sensor 120 may include an optical sensor, a mass sensor, capacitive sensor or any other sensor known to one of ordinary skill in the art. In embodiments wherein detection sensor 120 comprises an optical sensor, detection sensor 120 may comprise a photodetector, proximity detector, infrared sensor or any other optical sensor known in the art. With respect to an optical sensor, detection sensor 120 may detect the presence of a cleaning product based on the reflectivity of the cleaning product in comparison to the reflectivity of pad 140, as discussed herein. Detection sensor 120 may additionally or alternatively comprise a mass based sensor, such as a load cell and/or a capacitive sensor. Cleaning product 150 may be sensed based on the change in mass and/or force detected by the sensor when cleaning product 150 is placed on pad 140.

In some embodiments, detection sensor 120 may comprise a two prong detection sensor, similar to two prong detection mechanism 190 as described herein. In such embodiments, the electrical connection between the two prongs may be influenced by the distance between the two prongs and the medium between the two prongs. When the medium between the two prongs is changed (e.g. through the addition of cleaning product 150), detection sensor 120 may detect the presence of a cleaning product based on the change in the electrical connection between the two prongs.

Pad 140 may merely be a known location on the surface of the interior of the oven, or may be designated such as by use of a separate material. In certain embodiments, pad 140 may be designated by markings such as an outline, an X to mark the spot, be indented, or have the ability to be raised in order to provide contrast from the oven surface. Any known way to one of ordinary skill in the art to designate pad 140 may be used. In embodiments where the pad 140 comprises a material separate form that of the oven surface, pad 140 may comprise a translucent or transparent material, such as sapphire window, allowing detection sensor 120 to generate sensor data without needing to be positioned within the oven. However, placing detection sensor 120 within the oven has been contemplated. Pad 140 may additionally or alternatively comprise a material or coating which makes pad 140 less susceptible to becoming stained or tarnished from use of the oven. In some embodiments, the FOD of detection sensor 120 may merely be Pad 140, such as a portion of the oven's floor.

Detection sensor 120 may be placed either internally or on the exterior of the oven cavity, in such a way that the sensor can detect the presence or absence cleaning product 150 on pad 140. Detection sensor 120 may have the ability to send sensor data to controller 130 relating to the FOD of the sensor. Additionally or alternatively, detection sensor 120 may be able to withstand the operating temperature of oven 110, such as temperatures of 500 degrees F. However, detection sensor 120 may be placed in a protective device to limit high temperature exposure in order to still properly function. In situations where detection sensor 120 is exposed to internal features in the oven 110, detection sensor 120 may need to withstand caustic cleaners, hard water levels of up to 20 gpg, and greasy soils.

In the example shown in FIG. 1, detection sensor 120 is positioned underneath oven 110 to detect the presence and/or absence of cleaning product 150 on pad 140. In one aspect of the design, Pad 140 comprises a transparent protective surface 180 allowing detection sensor 120 to generate data concerning the interior of the oven through the sapphire window. In a preferred embodiment, the transparent protective surface 180 is a sapphire window. An oven cleaning process may be initiated using controller 130. In some examples, a user may initiate the oven cleaning process using user interface 136. In some embodiments, data from auxiliary sensors may be used when initiating the oven cleaning process. For example, a sensor positioned on door 170 may be used to determine whether or not door 170 is open or closed. Additionally or alternatively, an ambient temperature sensor may be used to determine whether or not the heating element in the oven has been turned off or has sufficiently cooled after turning off. In such embodiments, the oven cleaning process can only be initiated when door 170 is closed. In other embodiments, a separate device may initiate the oven cleaning process. In some examples, the oven cleaning process may be automatically initiated, such as once a day, after a certain amount of uses, or once a threshold of grease buildup is found in the oven.

Figure 2:
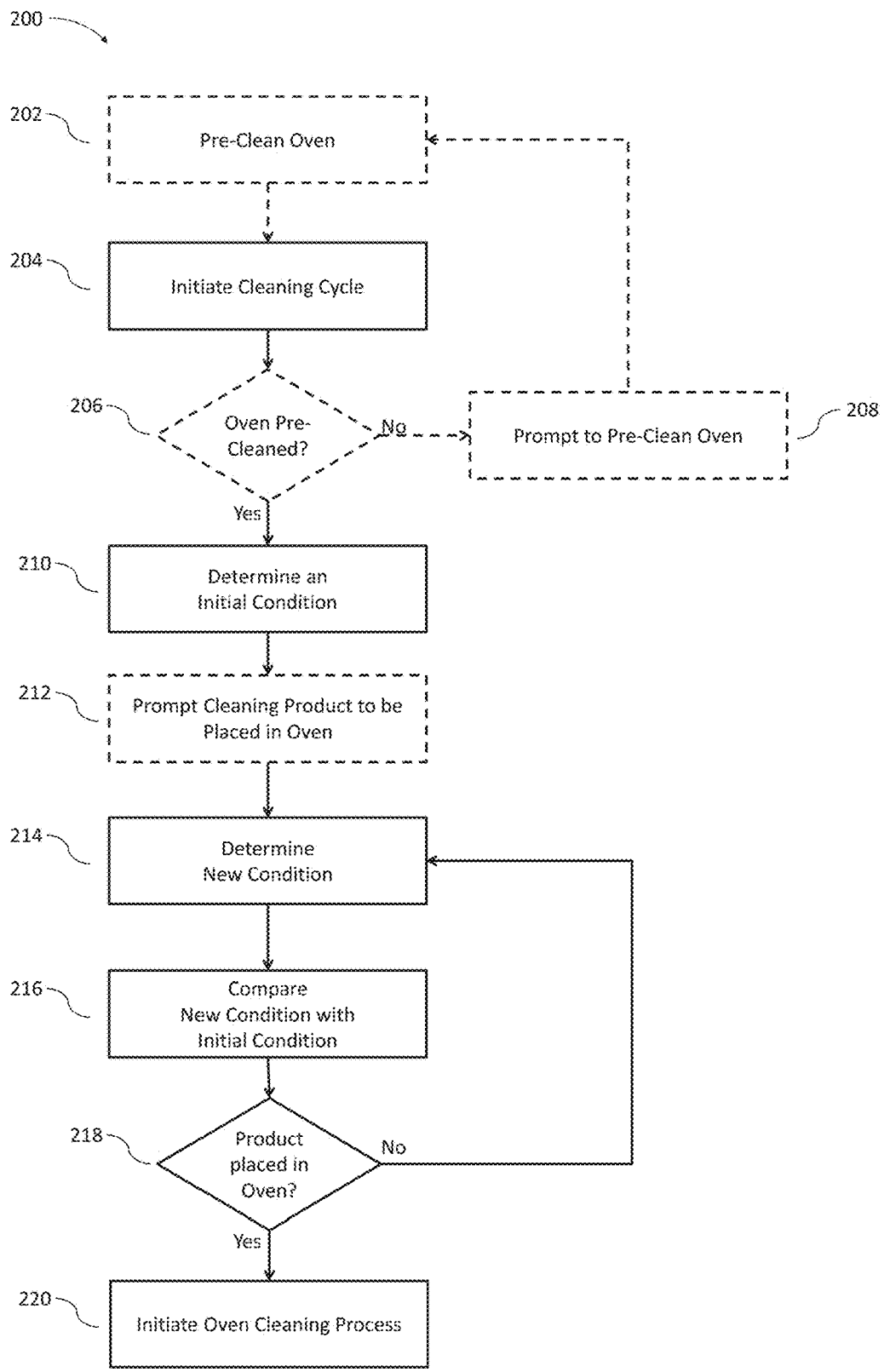
FIG. 2 is a flow diagram illustrating an example process by which a sensor can detect the addition of cleaning chemistry to a oven cleaning oven.

FIG. 2 is a flow diagram illustrating an example process (200) by which detection sensor 120 determines the presence or absence of a cleaning product in oven 110. Prior to the oven cleaning cycle, the oven can be is pre-cleaned as shown in step 202. Step 202 may be performed manually by a user or in an automated fashion. In some embodiments, the heating elements of the oven (e.g. oven 110) will be off and the oven's interior will be pre-cleaned of grease film by scraping the interior of the oven. Even though it is depicted in FIG. 2, the pre-cleaning of step 202 need not be performed. In some examples, the oven may not contain an excess buildup of unwanted materials, such as grease, because of the products being cooked in the oven, the frequency the oven is cleaned, the type of oven, or the pre-cleaning is part of a different process. In contrast, some examples may require the pre-cleaning to be performed to ensure the longevity of the oven, increase the efficiency of the cleaning cycle, or comply with health, safety, or other regulations.

After step 202 is optionally performed, the cleaning cycle is initiated in step 204. In some examples, step 204 may be automatically initiated if the oven's heating elements are turned off and the oven door 170 is open. In some embodiments, oven 110 may communicate (e.g. through connection 160) the state of the oven's heating elements and the oven door 170 to controller 130. Additionally or alternatively, auxiliary sensors may be used to determine the operational state of the heating elements and oven door, such as the ambient temperature sensor 185 and the proximity sensor 175 as shown in FIG. 1. Furthermore, step 204 may be automatically initiated such as once a day, after a certain amount of uses, or once a threshold of grease buildup is found in the oven. In other examples, the cleaning cycle in step 204 may be initiated manually, such as by a user through user interface 136.

Once the oven cleaning process is initiated in step 204, the system may optionally check if the oven was pre-cleaned in step 206. In some embodiments, step 206 may be a simple reminder through the user interface 136 wherein the user inputs if the pre-cleaning process was performed, such as the selection of a button or icon. If it is found that the oven pre-cleaning process has not been performed (e.g. a "No" in step 206), a prompt may be provided to pre-clean the oven (step 208). Step 208 may be performed through the controller 130 such as by alerting a user through a notification (e.g. notification 138) or using user interface 136. In such cases, the prompt alerts the user to perform a pre-cleaning of the oven.

Similar to step 202, steps 206 and steps 208 are optional. In situations where the oven is either not pre-cleaned or not checked for pre-cleaning, steps 202, 206, and 208 do not need to be performed. Additionally, even if the pre-cleaning of step 202 is performed, the system need not check if the oven is pre-cleaned (step 206) or prompt the oven to be pre-cleaned (step 208). In some embodiments, after initiating the cleaning cycle in step 204, a user is prompted to pre-clean the oven as a reminder; regardless of whether the oven was pre-cleaned. In further examples, the process will question whether the oven is pre-cleaned and not revert back to step 202 or step 204, but rather just store the information for later use, in memory 134 for example.

Once the oven is optionally checked for the pre-cleaning process, an initial condition is determined in step 210. In some embodiments, step 210 may be performed as soon as the heating elements of the oven are off and the oven door is opened. The initial condition determined in step 210 may be gathered using data from a sensor (e.g., detection sensor 120). In some embodiments, the initial condition will come from a plurality of sensors. The plurality of sensors may be similar to the sensors described with respect to detection sensor 120. In such examples, there may be a plurality of sensors each with complementary pads 140. Such an embodiment may be used when the cleaning product 150 is placed in a plurality of locations, or various types of cleaning product 150 are used. Additionally or alternatively, there may be a plurality of pads for each sensor or a plurality of sensors for each pad. In some embodiments, the sensor's FOD may be large enough to detect the presence or absence of cleaning product on multiple pads. In embodiments where a plurality of sensors are used, each sensor need not be identical. For example, a reflective sensor may be used to determine the presence or absence of cleaning product 150 on pad 140 with the additional help from an ambient light sensor or ambient temperature sensor to allow for more accurate results. Additionally or alternatively, various sensors may be used based on the type of pad 140, the location of pad 140, the type of cleaning product 150, or the amount of cleaning product 150.

As discussed herein, an initial condition may be determined from data generated by detection sensor 120. The initial condition may merely be a single value from the sensor. Alternatively, the initial condition may be a rolling average over a time period. The time period may be between 1 and 30 seconds, preferably around 20 seconds, however other time periods have been contemplated, such as less than 1 second and greater than 30 seconds. Additionally, statistical analysis methods may be used on the data, such as confidence intervals, probability intervals, standard deviations, or any other statistical analysis method known to one of ordinary skill in the art. In some embodiments, the statistical analysis is used to remove outliers. Once an initial condition has been determined in step 210, the system may optionally prompt cleaning product to be placed in the oven (step 212). Step 212 may be performed through the control 130 such as by alerting a user through alert 138 or using user interface 136. Additionally or alternatively, step 212 may prompt an automated cleaning system, through controller 130, to place cleaning product in the oven.

In some embodiments, step 212 is not performed and the process goes directly into determining a new condition (step 214). Step 214 is similar to step 210 in that the new condition is determined from data generated by detection sensor 120. The new condition may merely be a single value from the sensor. In other examples, the new condition is a rolling average over a time period. The time period may be between 1 and 30 second, preferably 20 seconds, however other time periods have been contemplated, such as less than 1 second and greater than 30 seconds. In other embodiments, other statistical analysis method may be used, such as statistical analysis methods discussed herein. In preferred embodiments, the same statistical measures will be taken when determining the initial condition and the new condition. In such embodiments, using the same statistical measures may yield more accurate results.

Once the new condition is determined (step 214), the new condition and the initial condition are compared in step 216. Step 216 may utilize any comparison method known in the art, such as finding the difference between the new condition and initial condition. In embodiments wherein the new condition and initial condition are represented by numerical values, the values may be compared by determining the difference. Comparing the new condition and the initial condition in step 216 is used to determine if cleaning product is placed in the oven (step 218). In preferred embodiments, step 218 determines if cleaning product is placed in the oven on the designated locations (e.g. pad 140). Comparing the new condition and the initial condition may be performed using any method known to one of ordinary skill in the art. In some embodiments, the new condition and the initial condition are compared using a look-up table. In embodiments where the new condition and the initial condition are numerical values, their difference may be calculated as a comparison.

Once the new condition and the initial condition are compared in step 216, the comparison is used to determine if the cleaning product has been placed in the oven (step 218). Step 218 may use the comparison of step 216 to determine if cleaning product is present in the oven, such as a threshold difference between the new condition and the initial condition. Additionally or alternatively other data may be used to determine if the cleaning product has been placed in the oven. For example, if a sensor is present on the oven door, and the oven door hasn't been opened, it may be inferred that no cleaning product has been placed in the oven.

If it is determined that a cleaning product was placed in the oven (e.g. "Yes" in Step 218), the oven may proceed to step 220 wherein the oven cleaning process is initiated. The oven cleaning process may be any oven cleaning process known to one of ordinary skill in the art, such as the addition of warm water. Other exemplary oven cleaning processes may comprise one or more cleaning sprays, a series of rinses, and/or steaming the oven. The oven cleaning process may be initiated after meeting other requirements, such as the closing of the oven door or a specified time. If it is determined that a cleaning product was not placed in the oven (e.g. "No" in Step 218), the process may revert to step 214 to determine a next new condition. Optionally, the system may revert to step 212 and re-prompt for cleaning product to be placed in the oven. In such embodiments, a prompt need not be performed every time, but could happen after a designated amount of comparisons (e.g. step 216) or a designated amount of time. Re-prompting in step 212 may act as a reminder to the user or automated device to place cleaning product in the oven. In some embodiments, the next new condition is determined using a similar process to that of the new condition. For example, new sensor data from detection sensor 120 may be used to determine the next new condition, which then can be compared with the initial condition in step 216. Alternatively, the new sensor data may be compared with the new condition rather than the initial condition, such that the previous new condition becomes the initial condition and the next new condition becomes the new condition. The process is repeated until it is determined that a cleaning product was placed in the oven in Step 218 or the process is otherwise terminated. The process may be terminated manually by a user, by a processor (e.g. processor 132), after a specified amount of time, or by any other means known to one of ordinary skill in the art.

Ideally an oven (e.g. oven 110) would always be pristinely clean throughout the life cycle of the oven. In such situations, sensors (e.g. sensor 150) would continuously provide accurate and consistent measurements on every use. Unfortunately, ovens generally corrode over time, subjecting the sensor to inconsistent measurements between cleaning cycles. Ovens may become stained or tarnished because of improper cleaning, excessive use, excessively aggressive cleaning chemistries, resin buildup from products cooked in the oven, or various other reasons known to persons of ordinary skill in the art. Because the oven's condition may be constantly changing, the initial and new conditions used to represent the presence and absence of a cleaning product may change over time as well. Additionally or alternatively, changes in sensor data (e.g. because of corrosion or tarnish in the oven) may be monitored to determine whether or not the oven's condition has changed over time, such as because of a lack of cleaning.

Figure 3:
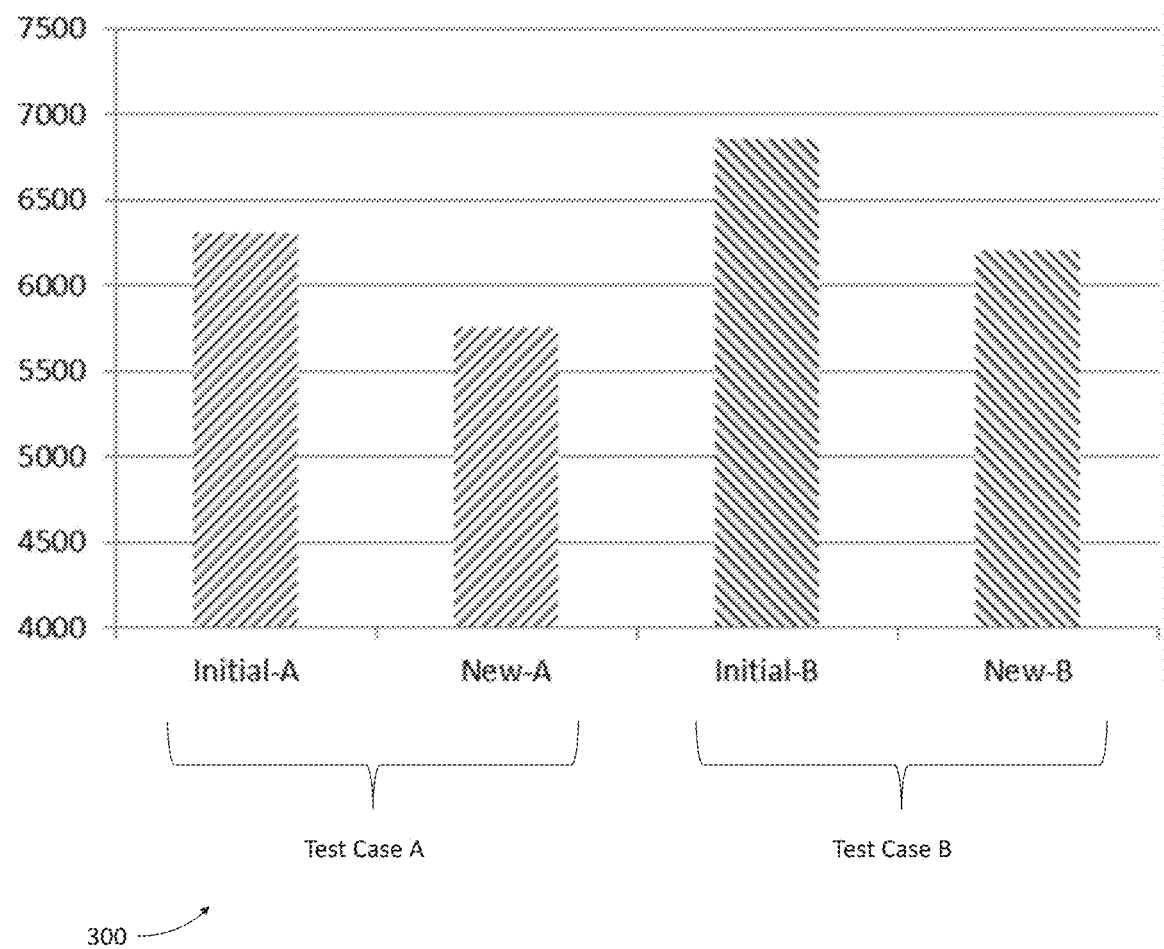
FIG. 3 is an exemplary bar graph showing data from a sensor used in a self-cleaning oven.

FIG. 3 is shows exemplary example 300 of determining the initial conditions and new conditions described with respect to 210 and 214 of FIG. 2. The sensor used in this embodiment is a QRD1114 Reflective Object Sensor which consists of an infrared emitting diode and an NPN silicon phototransistor. The phototransistor responds to radiation emitted from the diode only when a reflective object or surface is in the FOD of the sensor. Even though the embodiment relates to a specific reflective object sensor, one of ordinary skill in the art would understand that various other contact and non-contact sensors may be used, as described herein.

Two test cases are depicted in in FIG. 3, test case A and test case B. In an exemplarily embodiment, test case A is when the oven was originally installed and test case B may be after a period of time, such as 5 years. Initial-A and New-A are associated with test case A and Initial-B and New-B are associated with test case B. With reference to FIG. 2, Initial-A is a determined initial condition as shown in Step 210 and New-A is a determined new condition as shown in Step 214. Similarly, Initial-B is a determined initial as shown in Step 210 and New-B is a determined new condition as shown in Step 214. One of ordinary skill in the art would understand that numerous new conditions may have been gathered and compared to the initial conditions (i.e. the loop of Step 214-218 in FIG. 2) before the new conditions of New-A or New-B were determined.

As shown in FIG. 3, even though Initial-A and Initial-B refer to initial conditions and New-B and New-B refer to new conditions, the oven was tarnished between the test cases causing a significant change in values. The higher values shown in test case B may be because pad 140 was stained from use of the oven or pad 140 had excess grease from an improper pre-cleaning process. If a predetermined initial condition is used, such as a value when the oven is new, the gathered data may incorrectly determine the presence or absence of cleaning product in the oven. In the example of FIG. 3, Initial-A and New-B have relatively similar values. In systems using a predetermined initial condition, Initial-A and New-B may be incorrectly treated as the same condition because of their relatively similar values. The method of FIG. 2 as described herein helps such errors by determining an initial condition (e.g. Initial-A or Initial-B), prompting cleaning product to be placed in the oven (e.g. prompting a user through a user interface), determining a new condition (e.g. New-A or New-B), and then comparing the new condition and the initial condition to determine if cleaning product is present in the oven. With respect to FIG. 3, even though the values from test case A and test case B differ, the values within test case A and test case B stay relatively the same. In other words, when comparing Initial-A and New-A or Initial-B and New-B a processor (e.g. processor 132) can accurately determine the presence of cleaning product in both test cases by the relative reduction in value between Initial-A and New-A as well as Initial-B and New-B.

What is claimed is:

1. A system for controlling an initiation of a cleaning process for an interior of an appliance, comprising:
a detection sensor, the detection sensor configured to generate detection sensor data based on a sensed condition in a field of detection (FOD) of the detection sensor, wherein
the FOD of the detection sensor comprises one or more pre-determined locations in the interior of the appliance, each pre-determined location intended for the receipt of a cleaning product that is used during the cleaning process; and
a processor operatively coupled to the detection sensor, the processor being configured to control the initiation of the cleaning process, the control of the initiation of the cleaning process comprising:
receiving detection sensor data representative of a first time, the first time being a time when no cleaning product is present at the one or more pre-determined locations;
generating an initial condition based on the received detection sensor data representative of the first time;
receiving detection sensor data representative of a second time, different than the first time;
generating a new condition based on the received detection sensor data representative of the second time;
comparing the initial condition and the new condition; and
determining if cleaning product is present at the one or more pre-determined locations at the second time based on the comparison of the initial condition and the new condition.

2. The system of claim 1, wherein the appliance is an oven; and the oven comprises at least one heating element, and further comprising a first auxiliary sensor, the first auxiliary sensor configured to sense whether the at least one heating element is on or off, and wherein the processor receives detection sensor data representative of the first time when the first auxiliary sensor indicates that the at least one heating element of the oven is off.

3. The system of claim 1, further comprising a second auxiliary sensor, the second auxiliary sensor configured to sense whether a door for the appliance is open or closed, and wherein the processor receives detection sensor data representative of the first time when the second auxiliary sensor indicates that the door of the appliance is open.

4. The system of claim 1, wherein the detection sensor is located underneath the appliance and the FOD of the detection sensor comprises a portion of the bottom of the appliance.

5. The system of claim 4, wherein the one or more predetermined locations comprise a sapphire window.

6. The system of claim 1, wherein the detection sensor is a reflective sensor.

7. The system of claim 1, wherein the detection sensor is a mass sensor.

8. The system of claim 1, wherein the detection sensor is a two prong detection mechanism.

9. The system of claim 1, further comprising:
a user interface; and
the processor further configured to receive, via the user interface, instructions to initiate the cleaning process.

10. The system of claim 9, wherein the processor is further configured to:
determine if an appliance pre-cleaning process has been performed;

if the processor determines the appliance pre-cleaning process has not been performed, prompt, via the user interface, to initiate the appliance pre-cleaning process; and wherein the processor receives detection sensor data representative of the first time when the processor determines that the appliance pre-cleaning process has been performed.

11. The system of claim 9, wherein the processor is further configured to prompt a user, via the user interface, to place a cleaning product at the one or more pre-determined locations after receiving detection sensor data representative of the first time.

12. The system of claim 11, wherein if the processor determines the cleaning product is not present at the second time, prompt a user, via the user interface, to place the cleaning product at the one or more pre-determined locations after receiving sensor data representative of the second time.

13. The system of claim 11, wherein if the processor determines the cleaning product is present at the second time, initiate the cleaning process of the interior of the appliance.

14. The system of claim 13, wherein the system comprises a two prong detection mechanism configured to sense whether or not the cleaning product has been placed at the one or more predetermined locations; and wherein
the processor determining that the cleaning product is present at the second time comprises receiving a signal from the two prong detection mechanism representative of the cleaning product having been placed at the one or more predetermined locations.

15. The system of claim 1, wherein:
generating the initial condition based on the received sensor data representation of the first time comprises a statistical analysis of the sensor data; and
generating the new condition based on the received sensor data representative of the second time comprises a statistical analysis of the sensor data.

16. The system of claim 15, wherein:
the sensor data representative of the first time comprises sensor data over a first period of time; and
the sensor data representative of the second time comprises sensor data over a second period of time, same as the first period of time; wherein
the statistical analysis of the sensor data for generating the initial condition comprises averaging the sensor data over the first period of time, and the statistical analysis of the sensor data for generating the new condition comprises averaging the sensor data over the second period of time; and wherein
each of the first period of time and the second period of time is between 5 and 30 seconds.

17. The system of claim 1, wherein the cleaning product is composed of one or more blocks or the cleaning product is composed of a powder.

18. A method for controlling the initiation of a cleaning process for an interior of an appliance, the method comprising:
receiving sensor data from a detection sensor representative of a first time, the first time being a time when no cleaning product is present within a field of detection (FOD) of the detection sensor, wherein
the FOD of the detection sensor comprises one or more pre-determined locations in the interior of the appliance, each pre-determined location intended for the receipt of the cleaning product used during the cleaning process;

generating an initial condition based on the received detection sensor data representative of the first time;
receiving sensor data from the detection sensor representative of a second time, different than the first time;
generating a new condition based on the received detection sensor data representative of the second time; and
determining if cleaning product is present at the one or more pre-determined locations at the second time based on the comparison of the initial condition and the new condition.

19. The method of claim 18, further comprising:
receiving sensor data from a first auxiliary sensor representative of whether a heating element is on or off based on the received sensor data from the first auxiliary sensor, wherein
the heating element configured to heat the interior of the appliance;
determining whether the heating element is on or off, and initiating the cleaning process for the interior of the appliance if the heating element is determined to be off.

20. The method of claim 18, further comprising:
receiving sensor data from a second auxiliary sensor representative of whether a door for the appliance is open or closed; wherein
the door for the appliance is openable to access the interior of the appliance and closable to close off the interior of the appliance; and
determining whether the door for the appliance is open or closed based on the received sensor data from the second auxiliary sensor, and initiating the cleaning process for the interior of the appliance if the door for the appliance is determined to be closed.

21. A system for controlling the initiation of a cleaning process for an interior of an oven, comprising:
the oven;
at least one heating element;
a detection sensor, the detection sensor configured to generate detection sensor data based on a sensed condition in a field of detection (FOD) of the detection sensor, wherein
the FOD of the detection sensor comprises one or more pre-determined locations in the interior of the oven, each pre-determined location intended for the receipt of a cleaning product that is used during the cleaning process;
a first auxiliary sensor, the first auxiliary sensor configured to sense whether the at least one heating element is on or off; and
a processor operatively coupled to the detection sensor, the processor being configured to control the initiation of a pre-cleaning process and a cleaning process, the pre-cleaning process comprising:
receiving data from the first auxiliary sensor;
determining whether the heating element is on or off, and initiate the cleaning process for the interior of the oven if the heating element is determined to be off; the cleaning process comprising:
receiving detection sensor data from the detection sensor representative of a first time, the first time being a time when no cleaning product is present at the one or more pre-determined locations;
generating an initial condition based on the received detection sensor data representative of the first time;
receiving detection sensor data from the detection sensor representative of a second time, different than the first time;

generating a new condition based on the received detection sensor data representative of the second time;
comparing the initial condition and the new condition; and
determining if cleaning product is present at the one or more pre-determined locations at the second time based on the comparison of the initial condition and the new condition.

22. The system of claim 21, further comprising:
an oven door connected to the oven and openable to access the interior of the oven and closable to close off the interior of the oven;
a second auxiliary sensor, the second auxiliary sensor configured to sense whether the oven door is open or closed; and
the pre-cleaning process further comprising:
receiving data from the second auxiliary sensor;
determining whether the oven door is open or closed, and initiate the cleaning process for the interior of the oven if the oven door is determined to be closed.

* * * * *